Patented Oct. 26, 1926.

1,604,805

UNITED STATES PATENT OFFICE.

EDWIN POTTER CARPENTER, OF BROOKLYN, NEW YORK, ASSIGNOR TO AMERICAN MACHINE AND FOUNDRY COMPANY, A CORPORATION OF NEW JERSEY.

PROCESS OF MAKING A LAMINATED COMPOSITION.

No Drawing.     Application filed July 28, 1925. Serial No. 46,667.

This invention relates to a process of making a laminated composition having a curd base, for manufacture into articles of commerce in many arts; and it has for its main object the production of a composition of this nature in which the laminations are so firmly consolidated that they cannot be separated.

In carrying the invention into effect, units of plastic composition, such for example as inda or other material having a curd base, in sheets or in other forms, are semi-consolidated under moderate pressure and heat, as in a hydraulic press having steam heated platens but not using its full power. When the units reach this stage, much of the moisture they originally contained has disappeared. But some remains in the interior of the composition, that adjacent its surfaces being dissipated by the direct action of the heated platens with which the surfaces contact.

So far as I am aware, inda is an entirely new product, and it consists of curd which is devoid of fat and consolidated while in its natural wet state. Coloring matter is added to the wet curd when a colored product is desired, and albumen and natural salts are removed therefrom when a transparent product is desired. It is claimed in my copending application, filed July 3, 1925, Serial Number 41,437.

In laminating the composition, it is desirable that a sharp line of demarcation between the laminations be preserved, so that the union will not appear ragged. When two or more units are to be united to form a laminated structure, the surfaces which are to be brought into contact are moistened with water in order to bring the moisture content of the material adjacent the surfaces up to that of its interior, and to prevent irregular or ragged flow of the material from one unit to another during the succeeding operation.

When two or more units have been thus prepared and assembled one upon another, the assemblage is subjected to greater pressure and heat, to fully consolidate the material throughout.

The pressure and heat used in the initial operation may vary considerably, but approximately 800 lbs. per square inch, with a heat of approximately 140 F., gives satisfactory results, for semi-consolidation. For fully consolidating the assembled units, however, a pressure of approximately 1500 lbs. per square inch, and a heat of approximately 178 F., appear to be best.

Upon full consolidation of the laminated composition, the moisture disappears, but the sharp line of demarcation between the laminations remains.

The units may be of any color desired, for the presence of proper coloring matter has no effect upon the consolidation of the composition.

After the laminated composition has been thus produced, it is cured in formaldehyde under pressure.

What is claimed is:

1. The process of making a laminated plastic composition, which consists in separately semi-consolidating units of plastic material having a curd base under moderate pressure and heat, then moistening with water and assembling said units one upon another, then fully consolidating the assembled units under greater pressure and heat.

2. The process of making a laminated plastic composition, which consists in separately semi-consolidating units of inda under moderate pressure and heat, then moistening with water and assembling said units one upon another, then fully consolidating the assembled units under greater pressure and heat.

3. The process of making a laminated plastic composition, which consists in separately semi-consolidating units of plastic material having a curd base under a pressure of approximately 800 lbs. per square inch and a heat of approximately 140 F., then moistening with water and assembling said units one upon another, then fully consolidating the assembled units under a pressure of approximately 1500 lbs. per square inch and a heat of approximately 178 F.

4. The process of making a laminated plastic composition, which consists in separately semi-consolidating units of plastic material having a curd base under moderate pressure and heat, then moistening with water and assembling said units one upon another, then fully consolidating the assembled units under greater pressure and heat, then curing the fully consolidated material in formaldehyde under pressure.

In testimony whereof, I have signed my name to this specification.

EDWIN POTTER CARPENTER.